UNITED STATES PATENT OFFICE.

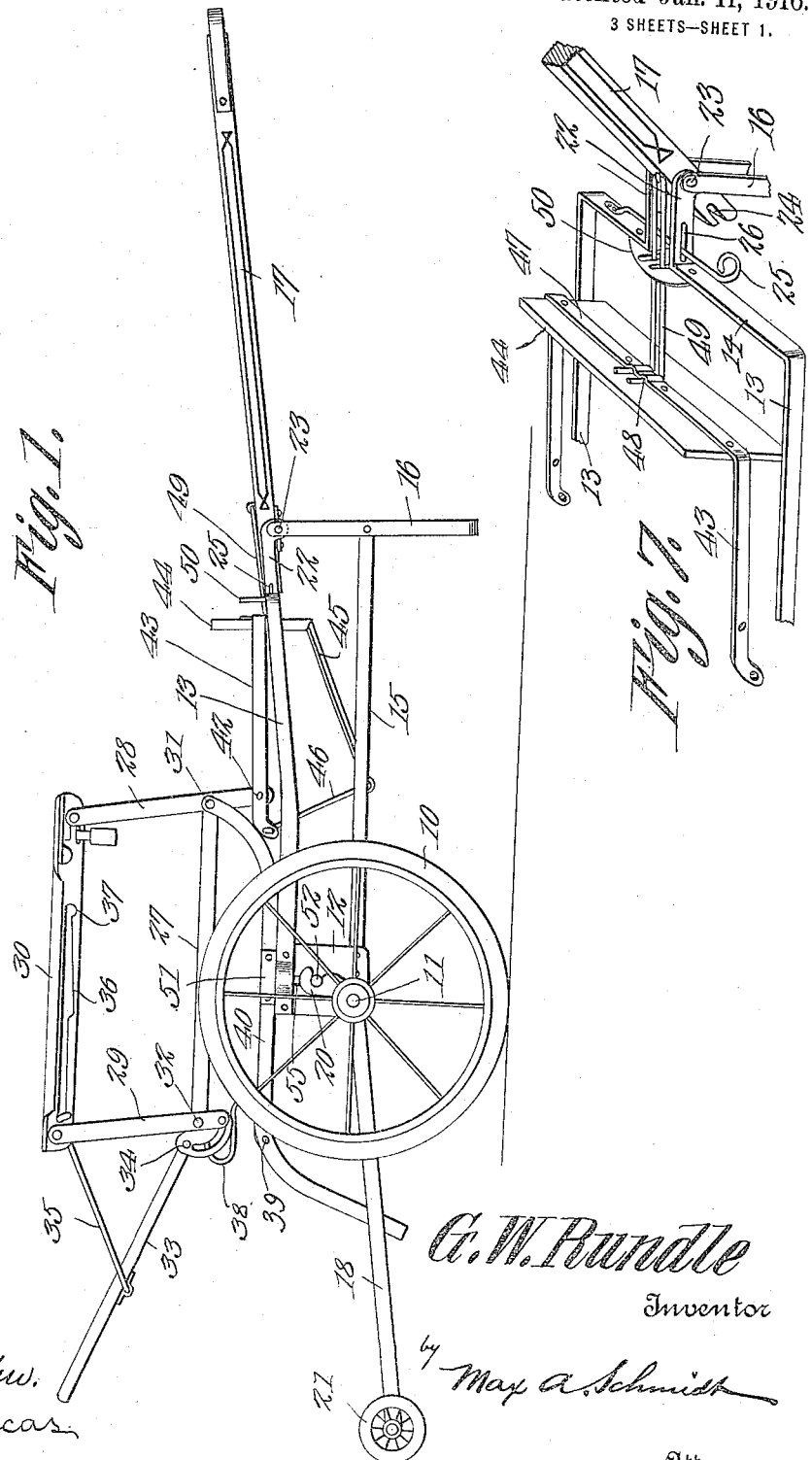

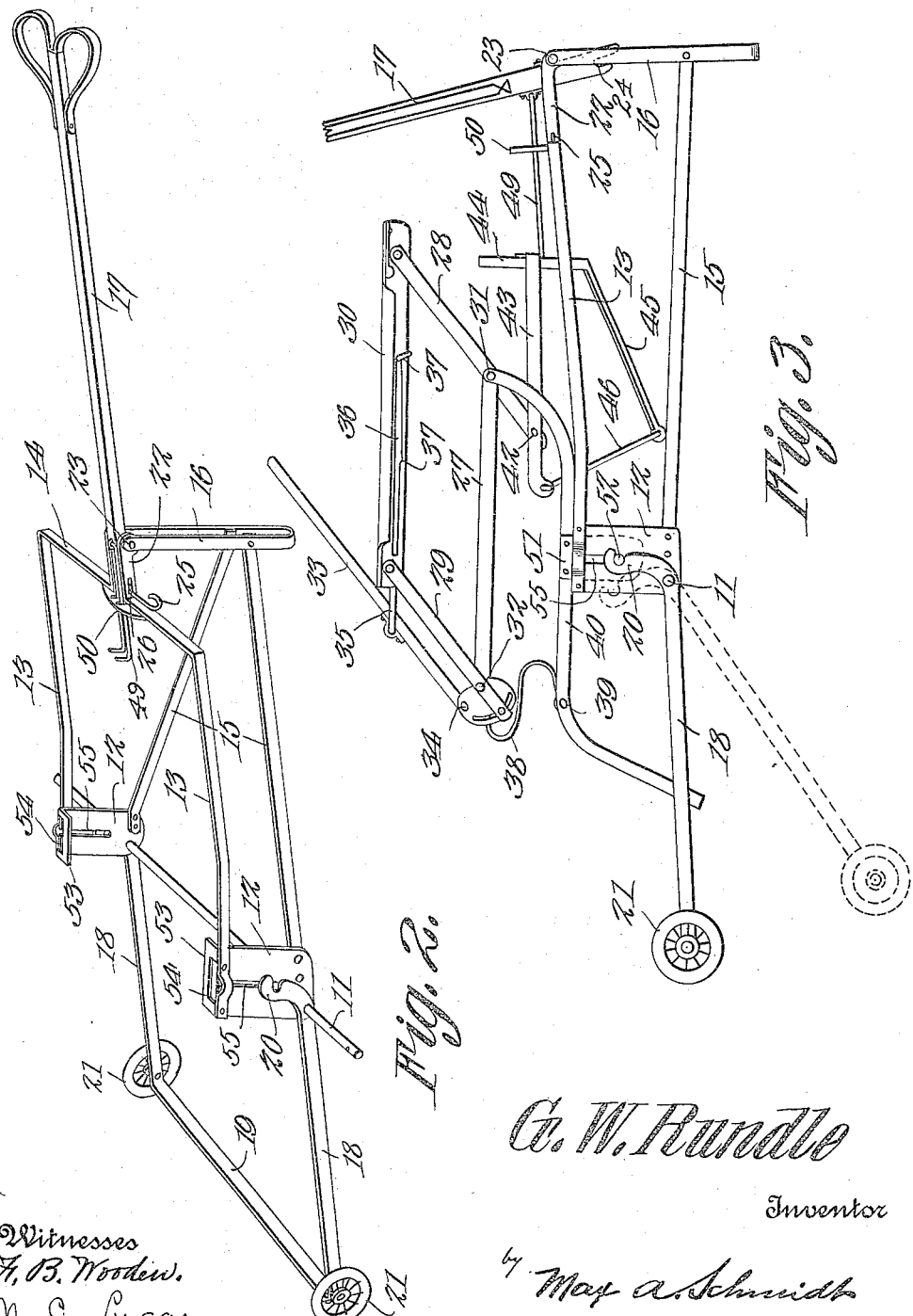

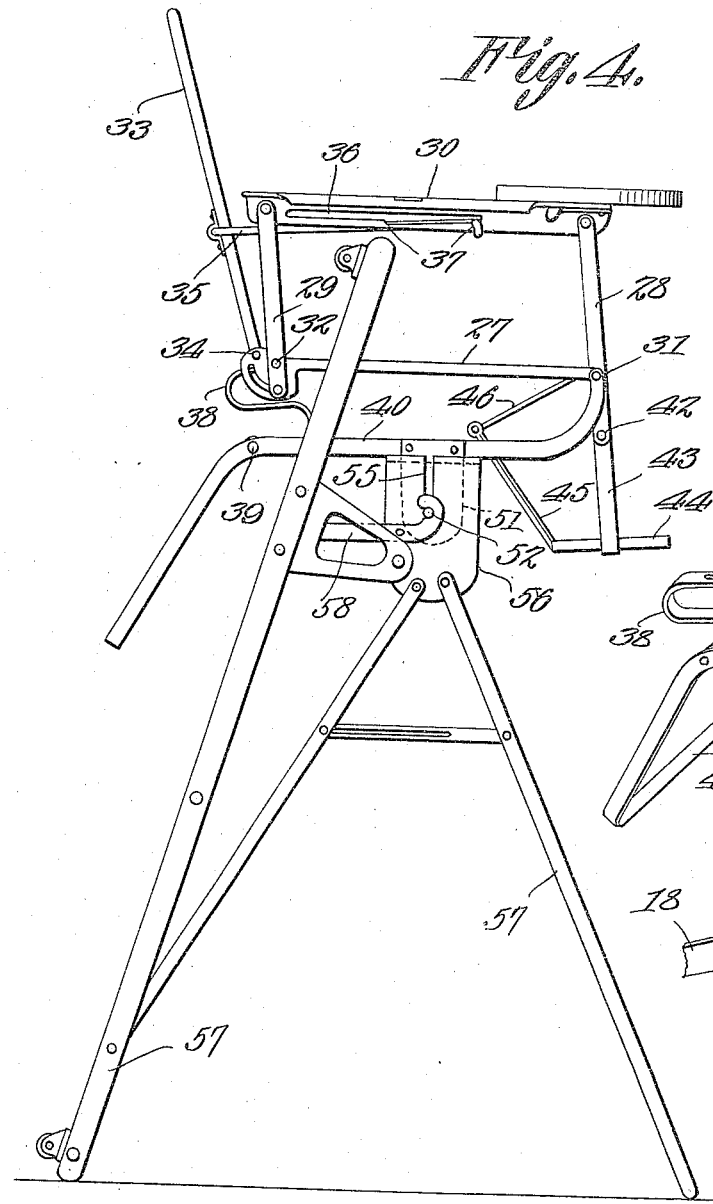
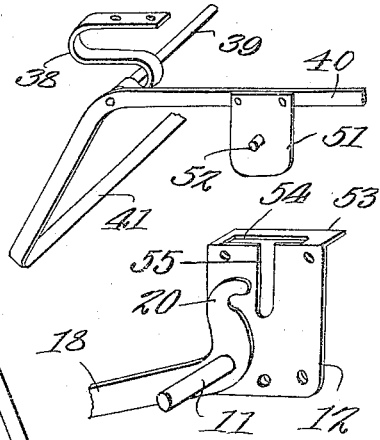

GEORGE W. RUNDLE, OF SPOKANE, WASHINGTON.

SULKY.

1,167,525.

Specification of Letters Patent.  Patented Jan. 11, 1916.

Application filed November 23, 1914. Serial No. 873,495.

*To all whom it may concern:*

Be it known that I, GEORGE W. RUNDLE, a citizen of the United States, residing at Spokane, in the county of Spokane and State of Washington, have invented certain new and useful Improvements in Sulkies, of which the following is a specification.

This invention relates to children's carriages of the sulky type, and its object is to provide a novel and improved structure which permits collapse of the sulky into small and compact form for convenience in shipment and storage, and also to provide the sulky with a removable seat in order that the latter may be used as a high chair upon attaching supporting legs thereto. These objects are attained by means of a combination and arrangement of parts to be hereinafter described and claimed, reference being had to the accompanying drawings for a better understanding of the invention.

In the drawings Figure 1 is a side elevation of the sulky; Fig. 2 is a perspective view of the running gear, with the wheels removed; Fig. 3 is a side elevation showing the manner in which the sulky may be partly folded or collapsed; Fig. 4 is a side elevation showing the seat of the sulky removed from the running gear and used for a high chair;
Figs. 5 and 6 are details of portions of the seat structure, and Fig. 7 is a perspective view showing the connection between the tongue of the sulky and the foot rest of the seat.

Referring specifically to the drawings, the running gear of the sulky comprises a pair of wheels 10 mounted at the ends of an axle 11 carried by a frame which supports the seat to be presently described. This frame comprises laterally spaced plates 12, to which plates, at the top thereof, are rigidly fastened two rearwardly extending longitudinal side bars 13 connected at their rear ends by a cross-bar 14. To the plates, at the bottom thereof, are also rigidly fastened rearwardly extending side bars 15, which latter converge and are connected to a prop 16. The sulky is provided with a tongue or push bar 17. On the axle 11 is pivotally mounted a yoke-shaped frame, the branches of said frame being indicated at 18 and the transverse connecting portion at 19. The branches extend forwardly from the axle and have thereat upstanding hooks 20 designed for a purpose to be presently described. The axle passes through the hook-shaped ends of the yoke-branches 18 and pivotally supports the same. At the forward ends of the yoke-branches, where they are connected by the cross-piece 19, are mounted small wheels or rollers 21 which provide a rolling support when the sulky is tilted forward.

The cross-bar 14 is divided midway between its ends and formed thereat with laterally spaced, rearward bends 22 between which the tongue 17 is pivoted by a cross-pin 23 passing through said parts. This pin also secures the upper ends of the prop 16. The butt end of the tongue has a transverse notch 24 designed to receive a spring latch 25 carried by the cross-bar 14 and extending across the parts 22 through slots 26 therein. When the tongue is swung down in position for use, the latch snaps into the notch and holds the tongue in this position, and upon disengaging the latch the tongue may be swung upward to partly fold or collapse the sulky as will be presently described.

The seat of the sulky is indicated at 27. To the front and rear ends of the seat are pivoted uprights 28 and 29, respectively, carrying arm rests 30. The pivots of the front uprights are indicated at 31, and those of the rear uprights at 32. The arm rests are pivoted to the upper ends of the uprights. To the rear end of the seat is pivoted a back rest 33, as indicated at 34, provided with a locking bail 35 for holding the same at different angles; said bail being adjustably connected to the arm rests, the latter having slots 36 provided with retaining shoulders 37 engageable by the bail branches. The rear ends of the slots limit the downward swing of the back rest. The pivotal connection between the uprights, the arm rests and the back rest enables these parts to be partly collapsed or folded as shown in Fig. 3, the uprights and the back rest swinging in parallelism.

The seat 27 is supported at its rear end on S-shaped springs 38 made fast to a crossbar 39 connecting the intermediate portions of the branches 40 of a yoke. These yoke branches are connected to the front of the seat by the pivots 31, and they extend rearwardly beneath the seat, to the cross-bar 39, where they have a downward bend terminating in a connecting cross-piece 41. The lower ends of the front uprights 28 extend below the seat 27, and to said lower ends are pivotally connected, as indicated at 42, horizontal bars 43 carrying at their forward ends a foot rest 44 having a rearwardly extending portion 45 which is connected at its rear edge by rods 46 to the rear ends of the bars 43. The bars 43 have a connecting cross-piece 47 extending beneath the foot rest 44 and provided intermediate its ends with eyes 48 into which are adapted to be slipped the hook-shaped outer ends of rods 49 connected to the tongue 17. The crossbar 14 carries a plate 50 having guide slots through which the rods pass. The connection between the tongue 17 and the foot rest, and that between the foot rest and the bars 43 enables the parts to be folded as shown in Fig. 3 upon releasing the latch 25 and swinging the tongue upward. When the seat and the foot rest are in position for use, the bars 43 extend horizontally from the seat, the foot rest part 44 being perpendicular, and the part 45 extending rearward therefrom at a slight slant, and the rods 46 extending upward from the rear end of the part 45 to the rear ends of the bars 43. Now, as the bars 43 are connected to the lower ends of the uprights 28, below their pivots 31, the rearward thrust on the bars 43, through the rods 49, when the tongue 17 is swung upward, causes the uprights 28 to tilt forward and downward, the rear uprights 29 and the back rest 33 partaking of this movement by reason of the connection between these parts and the front uprights. The parts are now folded into small and compact form, so that the sulky may be carried on a street car. The folding feature is also advantageous in view of the convenience in storage and shipment.

The seat is removably connected to the running gear by the following means: To the branches 40 of the seat supporting yoke, between their connection 31 with the front end of the seat and the springs 38 supporting the rear end of the seat, are rigidly fastened depending plates 51 having outstanding pins 52. The plates 12 having outstanding horizontal flanges 53 at the top, provided with slots 54 at their junction with the plates, and in said plates are slots 55 extending downward from the middle of the slots 54. The plates 51 are designed to be slipped down through the slots 54, the pins 52 seating in the slots 55. Thus, the seat is removably connected to the running gear. In order to hold the plates 51 against upward movement out of the slots 54, the hooks 20 are slipped over the pins 52, the latter projecting a sufficient distance from the plates 12 for this purpose. The hooks are engaged with the pins by swinging the yoke branches 18 upward, which also places said branches in position to properly support the wheels or rollers 21. Upon swinging the yoke branches down, the hooks slip off the pins and the seat may then be disconnected from the running gear. When the seat is removed from the running gear it may be used as the seat of a high chair by slipping the plates 51 into a plate 56 similar to the plate 12, said plate 56 carrying the legs 57 of the chair. Fig. 4 illustrates the chair. The bars 43 are now swung to extend downward to bring the foot rest 44 in proper position and thus convert the same into a chair foot rest. The plate 56 carries a pivoted locking bail 58 for the pins 52.

I claim:

1. A sulky comprising a running gear, a seat having front and rear pivoted uprights and arm rests pivotally connected to the upper ends of the uprights, a foot rest, bars supporting the foot rest and pivotally connected to the lower ends of the front uprights, a pivoted tongue on the running gear, and a connection between the tongue and the aforesaid bars for folding the uprights and the arm rests of the seat.

2. A sulky comprising a running gear, a seat having front and rear pivoted uprights and arm rests pivotally connected to the upper ends of the uprights, a back rest pivoted to the seat, a connection between the back rest and the arm rests, a foot rest, bars supporting the foot rest and pivotally connected to the lower ends of the front uprights, a pivoted tongue on the running gear, and a connection between the tongue and the aforesaid bars for folding the uprights, the arm rests and the back rest of the chair.

3. A sulky comprising a running gear, a seat having front and rear pivoted uprights and arm rests pivotally connected to the upper ends of the uprights, horizontal bars connected to the lower ends of the front uprights, a foot rest carried by the forward ends of said bars and having a rearwardly extending portion, a connection between said rearwardly extending portion and the rear ends of the horizontal bars, a pivoted tongue on the running gear, and a connection between the tongue and the horizontal bars for folding the uprights and the arm rests of the seat.

4. A sulky comprising a running gear, a seat removably mounted on the running gear, and an adjustable foot rest carried by the seat, and having separate foot-engaging parts, said foot rest being adjustable to bring either foot-engaging part into position for use.

5. A sulky comprising a running gear, a seat removably mounted thereon, and a foot rest pivotally connected to the seat, and having angularly connected foot-engaging parts, said foot rest being adjustable to bring either foot-engaging part into position for use.

6. A sulky comprising a running gear, a seat removably mounted on the running gear, a foot rest having a rearwardly extending portion, supporting bars for the foot rest pivoted to the seat, and a connection between the supporting bars and the rearwardly extending portion of the foot rest.

7. A sulky comprising a running gear, laterally spaced plates carried by the running gear, said plates having vertical slots and top horizontal flanges provided with slots, a seat, a support for the seat having plates which pass through the slots in the aforesaid flanges and have outstanding pins working in the first-mentioned slots, and hooks carried by the running gear and engageable with the pins.

8. A sulky comprising a running gear, laterally spaced plates carried by the running gear, said plates having vertical slots and top horizontal flanges provided with slots, a seat, a support for the seat having plates which pass through the slots in the aforesaid flanges and have outstanding pins working in the first-mentioned slots, a pivoted yoke carried by the running gear, the branches of the yoke having hooks engageable with the aforesaid pins, and rollers carried by the yoke.

9. A sulky comprising laterally spaced plates, said plates having vertical slots and top horizontal flanges provided with slots, an axle extending between and carried by said plates, wheels on the axle, a seat, a support for the seat having plates which pass through the slots in the aforesaid flanges and have outstanding pins working in the first-mentioned slots, a yoke having its branches pivotally mounted on the axle and provided with hooks engageable with the aforesaid pins, and rollers carried by the yoke.

In testimony whereof I affix my signature in presence of two witnesses.

GEORGE W. RUNDLE.

Witnesses:
E. D. WELLER,
IRMA RICE.

Copies of this patent may be obtained for five cents each, by addressing the "Commissioner of Patents, Washington, D. C."